Dec. 20, 1966 E. J. NIELSEN ETAL 3,293,593

MODULAR TERMINAL BLOCK

Filed Nov. 29, 1963 4 Sheets-Sheet 1

INVENTORS
Erik J. Nielsen & Thomas Parris, Jr.,
BY John H. Leonard,
their ATTORNEY.

INVENTOR.
Erik J. Nielsen &
BY Thomas Perris, Jr.,
John H Leonard,
their ATTORNEY.

MODULAR TERMINAL BLOCK

Filed Nov. 29, 1963 4 Sheets-Sheet 3

INVENTOR.
Erik J. Nielsen &
BY Thomas Parris, Jr.,
John A. Leonard,
their ATTORNEY.

MODULAR TERMINAL BLOCK

Filed Nov. 29, 1963

4 Sheets-Sheet 4

INVENTOR.
Erik J. Nielsen &
BY Thomas Parne, Jr.,
John H. Leonard,
their ATTORNEY.

3,293,593

MODULAR TERMINAL BLOCK

Erik J. Nielsen, Mequon, and Thomas Parris, Jr., Milwaukee, Wis., assignors to Square D Company, Park Ridge, Ill., a corporation of Michigan Filed Nov. 29, 1963, Ser. No. 326,678
10 Claims. (Cl. 339—198)

This invention relates to electric terminal strips and particularly a terminal strip which includes a plurality of individual duplicate terminal connector blocks arranged in a row in end-to-end abutting relation on a support and clamped to the support in fixed position thereon, the blocks being provided with connectors, respectively, to which electrical conductors may be connected.

Terminal strips of this general character have been provided heretofore. An example of such terminals is disclosed in United States Letters Patent to Hermon L. Van Valkenburg and Erik J. Nielsen, No. 2,981,922, issued April 25, 1961. The structure shown in the above-identified patent is directed to an electrical terminal strip wherein the blocks are mounted on a metal supporting channel having out-turned lateral flanges at the open side of the channel and which are received in parallel grooves extending through the blocks. Clamping means are provided at the ends of the row for holding the blocks firmly against each other.

In accordance with the present invention, a new and improved terminal strip of this general character is provided wherein blocks are arranged to be mounted in a row in end-to-end abutting relation either on a channel, such as disclosed in the above patent, or on the flat face of a panel, selectively.

For convenience in illustration, the form of the invention will be described herein as one wherein the blocks are supported on a supporting channel or on a panel of which the supporting face is disposed horizontally and facing upwardly. The blocks are mounted on the supporting face in an upright position wherein the connectors carried thereby are accessible from the top for connecting conductors thereto. It is to be understood that these positions are not absolute, but are merely for convenience in disclosing the relative positions of the various parts, as obviously the terminal could be connected on a panel or a channel-supporting face which is upright.

As more fully described hereinafter, each of the connector blocks of the terminal is identical with the others and each has a base portion for cooperation with the support, an upwardly facing connector-supporting ledge at the upper portion thereof, and an upright barrier extending upwardly above the ledge. Each has a forward end face and a rear end face, these faces being arranged so that when the blocks are assembled in a row, the faces face toward opposite ends of the row, respectively. The forward face of each block is of a configuration different from that of its rear face. The configurations are such that when the blocks are arranged in a row in proper abutting relation with their forward faces facing the same end of the row, a projection on one face of each block is accommodated in a complementary concavity on the adjacent face of the next adjacent block.

In addition to the connector blocks, a reversible barrier block is provided. The barrier block has both end faces of the same configuration as the projection on one of the end faces of a connector block so that it can be positioned at one end of the row of connector blocks, so that the configurations of both ends of the row are identical, or it may be connected at one of its faces to a connector block intermediate the ends of the row, and at the other of its faces to a terminal block in reversed position forward and rearwardly of the row, so that, again, the configurations of both ends of the row are identical. Both faces of the barrier block are arranged to be connected with the complementary cavity of a connector block, with one of the latter having its front and rear faces reversed relative to the front and rear faces of the other. These connector blocks at the opposite side of the barrier block face in opposite directions endwise of the row.

Various other advantages of the invention will become apparent from the following description wherein reference is made to the drawings, in which.

Figures 1, 2, 3, 4, 5:
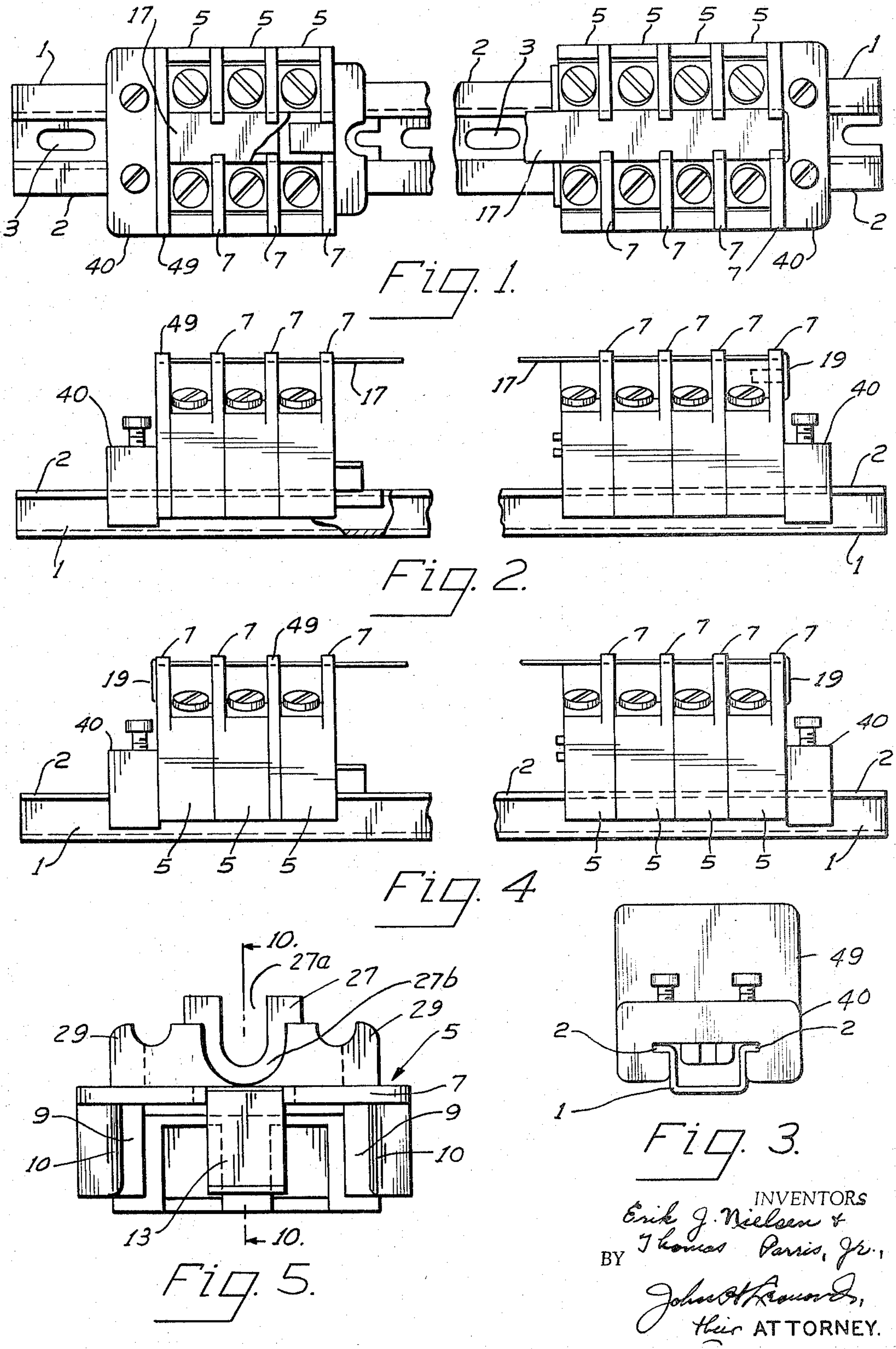
FIGURE 1 is a top plan view of a terminal embodying the principles of the present invention with the reversing barrier block being disposed at one end of the row of connector blocks, parts of the terminal strip support and of the marker strip being broken away for clearness of illustration.
FIG. 2 is a front side elevation of the structure illustrated in FIG. 1, part of the terminal strip being broken away for purposes of illustration.
FIG. 3 is a left end elevation of the structure illustrated in FIGS. 1 and 2.
FIG. 4 is a front side elevation, similar to FIG. 2, but showing the connector blocks arranged with the reversing barrier between two adjacent blocks of the row intermediate and spaced from the ends of the row.
FIG. 5 is a top plan view of a terminal connector block, the connector being omitted for clearness in illustration.
Figure 6:
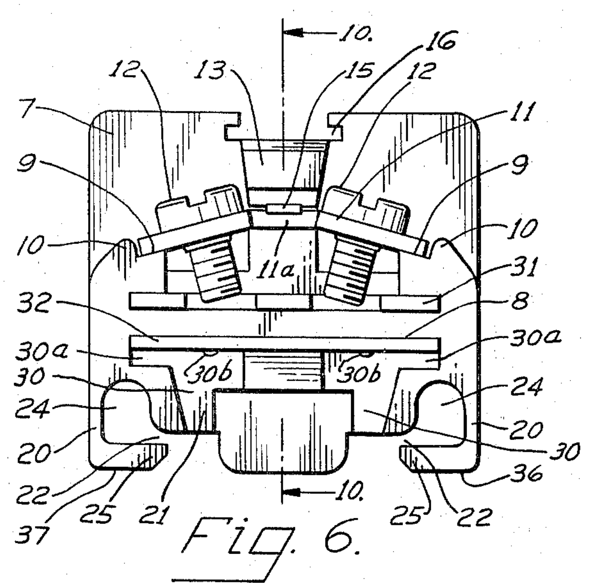
FIG. 6 is a front end elevation of the block illustrated in FIG. 5 with the connector installed.
Figure 7:
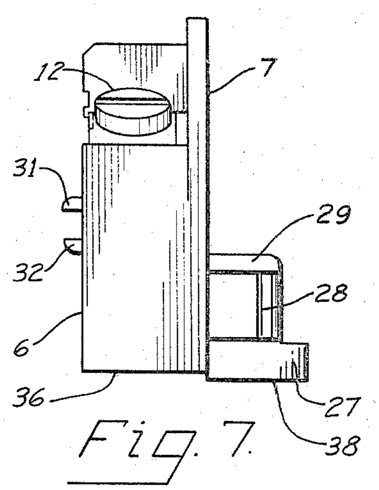
FIG. 7 is a right side elevation of the block illustrated in FIG. 6.
Figures 8, 9:
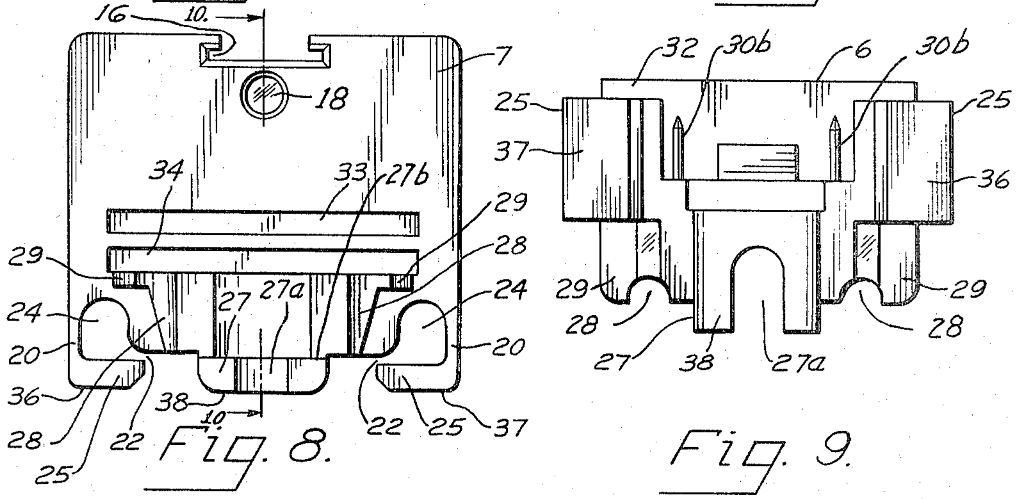
FIG. 8 is a rear end elevation of the block illustrated in FIGS. 5 through 7.
FIG. 9 is a bottom plan view of the block.
Figure 10:
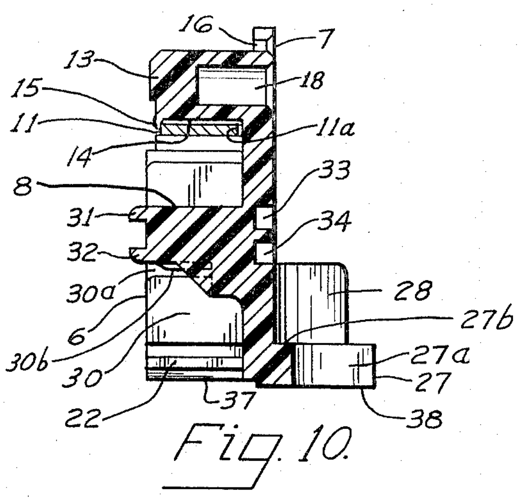
FIG. 10 is a vertical cross-sectional view of the block and is taken on lines 10—10 in FIGS. 5, 6 and 8.
Figure 11:
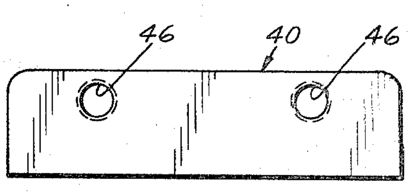
FIG. 11 is a top plan view of the end clamp of the present invention.
Figures 12, 13, 14, 15, 16, 17, 18:
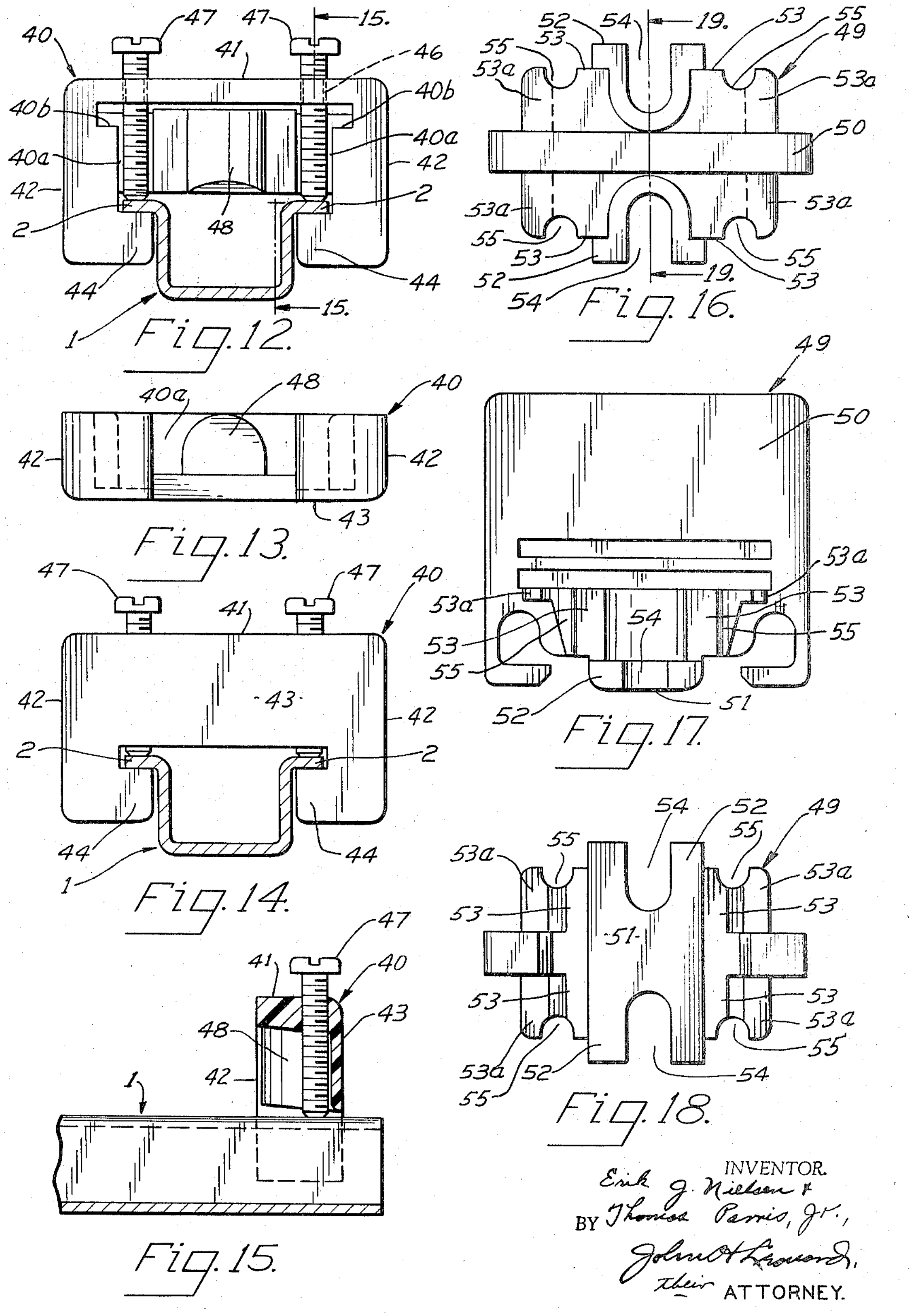
FIGS. 12 and 13 are a front elevation and bottom plan view, respectively, of the clamp.
FIG. 14 is a rear elevation of the clamp.
FIG. 15 is a vertical cross sectional view of the clamp and is taken on line 15—15 of FIG. 12.
FIG. 16 is a top plan view of the reversing barrier block of the present invention.
FIG. 17 is a front elevation thereof.
FIG. 18 is a bottom plan view thereof.
Figure 19:
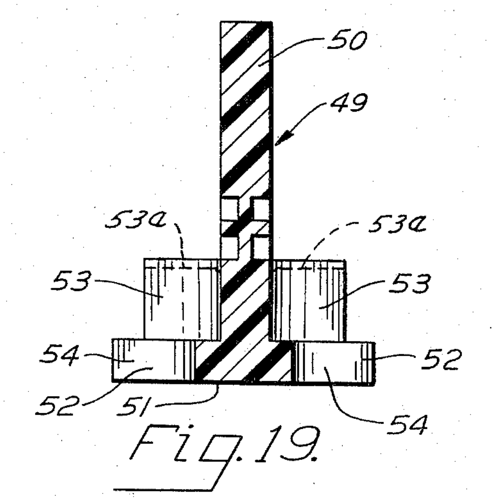
FIG. 19 is a vertical cross sectional view of the clamp and is taken on line 19—19 of FIG. 16.

Referring to the drawings, the invention is first described herein as embodied in a terminal strip wherein the individual terminal blocks are mounted on a conventional channel which is mounted on a flat panel.

Referring first to FIGURES 1 through 3, the blocks are shown as mounted on a support, in the form of a metal channel 1, arranged horizontally with its open side uppermost and having outturned lateral flanges 2 on its upper margins. The channel has elongated openings 3 in its bottom wall whereby the channel can be secured on a panel by screws, bolts and the like. Identical terminal blocks 5 are arranged in a row in end-to-end relation on the channel 1.

As best illustrated in FIGS. 5 through 10, each block 5 is a unitary structure, preferably molded in one piece of synthetic organic plastic material such, for example, as nylon of a quality having high cold flow resistance and low hygroscopicity. Other materials may be used, however, the important feature residing in the configuration and interrelation of the blocks and the accessory parts. Each block has a base 6 with a barrier 7 extending upwardly therefrom when the block is in proper position. The barrier 7 is arranged at the rear of the base 6. At its top, and extending forwardly from the bottom of the barrier 7, the base 6 has a top wall, indicated generally at 8, which, at its lateral margins, has upwardly facing shoulders 9 and laterally inwardly facing shoulders 10. The shoulders 9 provide ledge means for supporting a connector 11 and the shoulders 10 engage the opposite ends of the connector 11 for holding the connector in position on the block and preventing its removal transversely of a block or endwise of the connector, while it rests on the ledge means. The connector 11 has a midportion 11*a* of reduced width forwardly and rearwardly of the block and is provided with the usual clamping screws 12 by which a conductor can be connected to it.

In order to restrain the connector from removal in a direction upwardly from the top wall 8 of the block 5, the block has a restrainer 13. The restrainer is integral with the barrier 7 and extends forwardly therefrom above the level of the top wall 8 with its shoulders 9 in position such that its underface 14 overhangs the upper face of the midportion 11*a* of the connector 11 with clearance. When the connector is disposed in operating position on the shoulders 9, the midportion extends in a direction forwardly from the barrier and preferably terminates, at the forward edge of the midportion, slightly rearwardly from the forward end of the restrainer 13.

To prevent displacement of the connector forwardly of the block, during assembly and disassembly, the lower margin 15 of the forward end of the restrainer 13 is distorted downwardly so as to overlie slightly the forward edge of the connector midportion 11*a*. With the material specified, this may be done by heat sealing; that is, by softening the forward lower edge of the restrainer 13 by heat and, while it is in a soft condition, pressing it downwardly and inwardly, preferably firmly against the forward edge of the midportion 11*a*, and allowing it to set in that condition.

Each barrier 7 has a notch 16 at its midportion. The aligned notches 16 accommodate a common marking strip 17. Each barrier also has a socket 18 for receiving the shank of a plug 19. The plug 19 is provided on the end barrier, or end barriers, for engaging the ends of the strip 17 and holding it in place in the notches 16.

The base portion 6 comprises essentially the top wall 8 with dependent side walls 20 and rear walls 21, thus defining a cavity which is open downwardly of the base at the midportion thereof, and forwardly endwise of the base at the front end of the base.

The side walls 20 are provided at the bottom with parallel grooves 22, respectively, which open toward each other inwardly transversely of the block and which extend entirely through the block from front to rear. These grooves receive the flanges 2 from the strip 1. The grooves 22 are enlarged in cross section, as indicated at 24, so as to render the side walls 25 resilient so that the lower wall portions defining the lower walls of the grooves are resiliently movable apart. As a result, the block 5 can be installed on the strip flanges 2 by pressing it downwardly thereon so that the flanges 2 engage and spread the wall portions 25 slightly apart and enter the grooves, whereupon the wall portions 25 snap back into place.

On the rear face of each block 5, at the bottom of the base 6 thereof, is a rearward projection 27 which has a vertical screw or bolt-receiving passage 27*a* therein. In the form illustrated, the passage is in the form of a U-shaped slot open not only at the top and bottom, but also rearwardly of the projection 27. This slot is adapted to receive a screw for fastening the block to a supporting panel when the block is to be supported on a panel of this nature instead of on the channel. The projection also has a countersunk shoulder 27*b* on which the underside of the screw head may seat with the top of its head at a level such that it can be accommodated in a cavity in the adjacent end of an adjacent block along with the portion 27. The projection 27 includes, also, upwardly extending portions 28 with laterally extending fins 29 at the top thereof.

At its front face the block has a concavity 30 and grooves 30*a* extending partway through the block from the front face and opening inwardly toward each other into, and forming a continuation of the cavity 30. The cavity 30 and grooves 30*a* are adapted to receive the portions 28 and fins 29 of the rear face of an identical block disposed in front of the one block when the blocks are assembled together endwise.

When the blocks are so mounted, the projection 27, the portions 28, and the fins 29 on the rear of a forward block are received through the open front of the cavity 30 and grooves 30*a* of the adjacent succeeding block and are accommodated therein with a clearance fit beneath the wall 8 and concealed thereby. The fins 29 do not engage those end walls of the grooves 30*a* which are outermost laterally of the blocks. However, ribs 30*b* may be provided on the underside of the wall 8 for light frictional engagement or interference fit with the top surfaces of the fins 29. The front and rear end faces of the side walls 20, including the ends of the portions 25, are preferably arranged parallel to each other and so that when several blocks have been assembled in a row, these surfaces abut, whereby the barriers 7 are parallel to each other and spaced equidistantly apart endwise of the row with the connectors 11 in the spaces between barriers 7 of adjacent blocks, respectively. The projections and cavity walls are so engaged that the blocks cannot rock independently of each other about an upright axis, or horizontal axes extending endwise of the row. The areas which limit the movements of the blocks endwise are provided by the fins 29.

The wall 8 has a forward interrupted projection 31 and a continuous projection 32 disposed therebeneath. These projections are provided for electrical clearance purposes and extend forwardly from the forward face of the block and are receivable in cavities 33 and 34, respectively, in the rear face of the adjacent block, with clearance. The interruption in projection 31 is to maintain electrical clearance and clearance for the screws 12 while providing a shape that can be molded integral with the block. The projection 31 may be omitted, if desired.

Thus, when the blocks 5 are assembled in a row, none of the forwardly and rearwardly projecting portions on the front or rear faces are visible. Instead, they are concealed in the cavities on the adjacent blocks.

As described, it is desirable that each block be such that it can be mounted either on a channel or directly on a panel. For this purpose, the bottommost surface portions of the blocks are coplanar and arranged so that when the blocks are disposed on a flat horizontal upwardly facing surface of a panel, the blocks are supported in proper upright operative position. Such bottommost surface portions may be areas on the bottoms of the side walls, repsectively, as at 36 and 37, respectively, and on the bottom of the rearward projections 27, as at 38.

When the blocks are mounted on a channel, as illustrated in FIGURES 1 and 2, suitable clamps 40, such as illustrated in FIGURES 11 through 15, are provided. As there illustrated, each clamp 40 comprises a body composed of a top wall 41 and side walls 42 and an end wall 43 depending from the top wall and providing a forwardly and downwardly open T-shaped cavity 40*a* presenting a pair of upwardly facing surfaces 40*b*. Inturned flanges 44 are provided at the base of the side walls 42 and the T-shaped cavity 40*a* and are arranged to engage the underside of the flanges 2 of the mounting channel 1.

Suitable threaded passages 46 extend through the top wall 41 and accommodate screws 47 which can be driven tightly against the upper surface of the flanges 2 for securing the clamp in clamping engagement with the channel 1.

The forward edges of the clamp 40 are adapted to engage the rear face of the adjacent one of the blocks 5. The clamp is provided interiorly with a central boss or forwardly extending projectin 48 which extends into the cavity 40*a* and is adapted to fit the wall of a corresponding concavity 27*a* in the rear projection 27 of the rear face of an adjacent block and hold the clamp accurately in position, transversely of the row, relative to the block.

The clamp is designed to fit over the projections, on the rear of the adjacent one of the blocks and when screwed in clamping relation to the channel 1, presses endwise of the row against the adjacent face of the end block and thereby holds the block against longitudinal movement on the channel 1. However, such cooperation cannot be obtained at the front of the front end block of the row where there is no such corresponding projection as projection 27.

In order to make it possible to use duplicate clamps at both ends of the row and at the same time provide a barrier at the forward face of the front block of the row, or at some intermediate location in the row, a reversing barrier block 49, illustrated in FIGURES 16 through 19, is provided.

The reversing barrier block 49 is essentially a barrier 50 corresponding to the barrier 7 on one of the blocks 5, and a base 51 having grooves corresponding to the grooves 22 of the blocks. On the opposite end faces of the base 51 are projections 52 having portions 53 including fins 53*a* which are identical with those on the rear face of a block 5. Thus the projections on either face of the barrier block 49 can be disposed in the same cooperation with the forward face of a connector block 5 as could the rear face of a connector block, and its barrier 50 will be positioned with respect to the block 5 to which connected, in the same position as would the barrier 7 of an adjacent block 5. At the same time, the front face of the barrier block, being provided with projections the same as at its rear face, the forward end of the row can cooperate with a clamp 40 in the same manner as the rear end of the row. Furthermore, the portions 52 have a passage 54 therein, corresponding to the passages 28, through which screws could be passed, if it is desired to fasten the reversing barrier block directly to a panel. It is noted that the barrier 50 does not have a notch corresponding to the notches 16 and hence, when used at the end of a row, holds the strip 17 in place. If used between the ends,the strips 17 of the portions of the row at opposite sides of the barrier 50 terminate at the barrier, and the plugs 19 are used at each end of the row.

Thus, with this arrangement, the blocks 5 can readily be assembled all with their forward faces facing in the same direction on a channel 1 or a panel. A clamp 40 can be placed over the projections on the rear face of the rear block and the rear block clamped firmly in place, the entire row of blocks forced tightly thereagainst, and another clamp 40 placed over the forward projections 52 and 53 of the reversing barrier block 49 at the forward end of the row and clamped in place, thereby holding the blocks in assembled condition. Cut-outs 55 are provided in the portions 53 and fins 53*a* for clearance for the screws 47 of the clamps 40.

It sometimes happens that it is desired to have certain of the blocks 5 in a row facing in one direction and part in the opposite direction, in which case, as illustrated in FIGURE 4, the reversing barrier 49 may be put between one group of blocks and another group of blocks in spaced relation to the ends of the row, permitting the reversal of the direction of facing of the blocks at one side of the basic block relative to those at the other side, with all of the advantages hereinbefore described.

Figure 20:
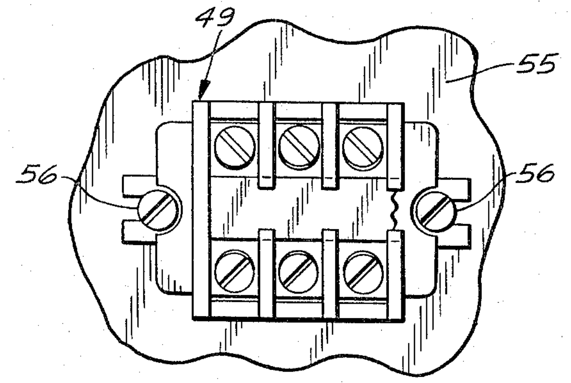
FIGS. 20 and 21 are a top plan view and front side elevation, respectively, showing the blocks mounted on a panel having a planar supporting face.
Figure 21:
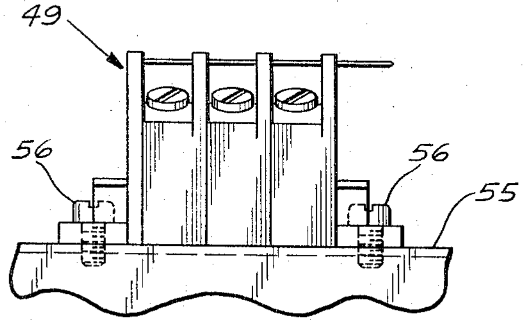

As illustrated in FIGURES 20 and 21, a row of blocks, similar to those illustrated in FIGURES 1 and 2, are shown as connected on the top wall of a panel 55 and held in place by screws 56, which extend through the passage 28 of one of the connector blocks and one of the passages 54 of a reversing barrier block. In such case, the end clamps 40 are not required.

Figure 22:
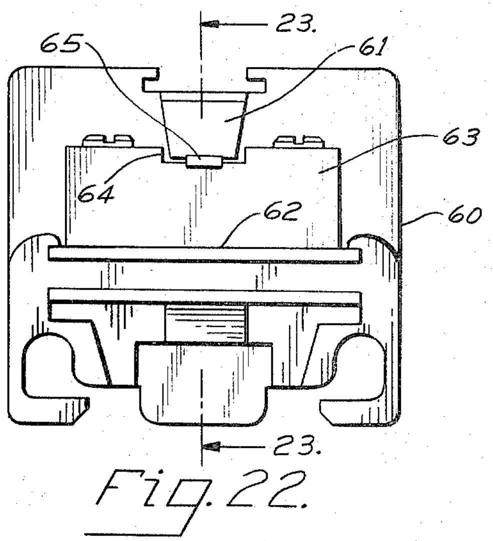
FIG. 22 is a front elevation of a modified form of block for supporting a tubular connector.
Figure 23:
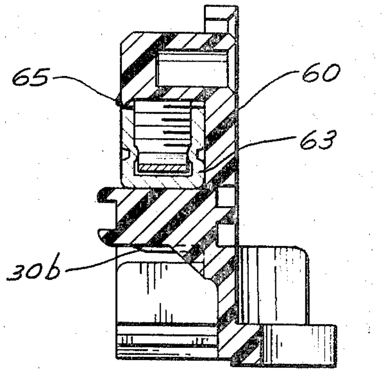
FIG. 23 is a vertical cross-sectional view of the block taken on line 23—23 of FIG. 22.

In some instances it is desirable to provide tubular connectors and for this purpose a block such as illustrated in FIGURES 22 through 23 is provided. With this form of connector a block 60 is provided and corresponds in all respects to the block 5 heretofore described, except that the projection or restrainer 61, corresponding to projection or restrainer 13 of block 5, does not extend as close to the upper supporting ledge 62. The tubular connector 63 has, at its midportion, a notch 64 which receives loosely the lower portion of the projection 61. The projection 61 prevents movement of the connector 63 upwardly away from the ledge 62 and laterally of the block, due to the engagement of the sidewalls of the notch 64 with projection 61. To prevent forward removal of the connector, the lower forward edge of the restrainer is distorted downwardly, as indicated at 65, so as to partially obstruct the space between it and the ledge 62. For this purpose, heat sealing may be used, the forward edge of the restrainer or projection 61 being softened by heat so as to overhang slightly the forward face of the connector 64, thus preventing it from movement forwardly. A block with this modified connector is assembled in a row in the same manner as hereinbefore described.

In all cases, the bottom-most surfaces of the blocks are coplanar so that they can rest on a horizontal panel supporting the blocks in proper upright position.

Having thus described our invention, we claim:

1. A terminal strip assembly comprising a plurality of identical connector blocks of electrical insulating material arranged in end-to-end abutting relation in a row, each block having a base portion with a plurality of bottommost areas which are planar, of substantial extent transversely and endwise of the row, and coplanar and adapted to support the block in upright position with said areas juxtaposed on the upper planar face of a horizontal panel support, each block having a barrier portion extending upwardly from the base portion when the block is in said upright position, said base portion having upwardly facing ledge means adjacent the base of the barrier portion, each base portion having, at a location below the ledge means, a pair of parallel grooves extending endwise through its base portion and spaced laterally of the block from each other and adapted to accommodate the lateral margins, respectively, of an elongated mounting strip support and support the block thereon for sliding endwise along the strip, each block having a front end and a back end, said ends being different in shape from each other, at least one end having a projecting portion projecting endwise of the row and the other end having a cavity opening endwise, said projecting portion and cavity being located and shaped so that the projecting portion of the block is receivable in snug fitting relation in the cavity of an adjacent block endwise of the row, and the ends of each block having portions with endwise facing areas arranged so that said endwise facing areas of adjacent ends of adjacent blocks engage and position adjacent blocks of the row with the barriers parallel to each other and spaced equidistantly from each other endwise of the row, clamping means for clamping at least one end block of the row to the selected one of the supports, a reversing barrier block having a base portion of which opposite ends are substantially identical with each other and with one end of a connector block and thereby those blocks of the row at one side of the barrier block are so arranged with the endwise projections projecting endwise of the row toward one end of the row and those blocks of the row at the other side of the barrier block are arranged with their projections projecting endwise of the row toward the other end of the row, and the barrier portion of the reversing barrier being disposed endwise of the row, between, and in spaced relation to, the barrier portions of the connector blocks adjacent to the barrier block.

2. The assembly according to claim 1 wherein each of the ends of the reversing barrier block is substantially identical with said one end of the barrier block having the projecting portion.

3. The assembly according to claim 2 wherein the projecting portions of the respective connector blocks and the two projecting portions of the barrier block each has a passage extending therethrough from top to bottom and adapted to receive a threaded fastener for securing the associated block to said selected support in said upright position.

4. The assembly according to claim 1 wherein the bottom-most areas of the blocks include the bottom faces of said projecting portions.

5. The assembly according to claim 1 wherein the clamping means comprises a clamp body abutting its associated end block and having a pair of parallel grooves extending therethrough endwise of the row and adapted to accommodate said margins, respectively, and screw means in the clamp body adapted to engage said margins for drawing the clamp body into clamping engagement therewith, said associated end block and clamp body having an interfitting projection and cavity connection with each other.

6. In a terminal strip, a plurality of terminal blocks of one type arranged in end to end abutting relation in a row and each carrying a terminal connector and having a projection on one face and a cavity opening through an opposite face, the cavity of each block being arranged to accommodate the projection of an adjacent block when the blocks are assembled in said row facing in the same direction, a single reversing block having a pair of oppositely facing projections each substantially identical with the projections on the terminal blocks so that each projection of the reversing block can be accommodated in said cavities, selectively, and thereby the reversing block may be selectively positioned at an end of the row and intermediate the ends of the row in a terminal strip when one reversing block and a plurality of terminal blocks are assembled to provide a terminal strip, and each projection having an opening therein for accommodating the shank of a threaded fastener and having a shoulder adjacent to the opening for engagement by the head of the fastener so that any selected ones of the blocks can be connected directly to a supporting channel member by a threaded fastener, said terminal blocks and the reversing block each having means for positioning it on the channel supporting member and clamping means, including a separate clamping member at at least one end of the row of blocks, for clamping engagement with the channel member for maintaining the blocks in longitudinally assembled relation on said channel member.

7. The combination according to claim 6 wherein additional terminal blocks may be added on either end of the assembled terminal strip without disturbing any of the blocks of the strip.

8. The assembly according to claim 6 wherein the clamping means comprise a clamp body abutting its associated end block and having a pair of parallel grooves extending therethrough endwise of the row and adapted to accommodate said margins, respectively, and screw means in the clamp body adapted to engage the strip for securing the clamp body in fixed position on the strip, and said clamp body has a cavity accommodating the projection of the associated end block and has an end surface abutting the associated end block.

9. The structure according to claim 8 wherein the projection of each block has a head receiving cavity which is adapted to accommodate the head of the threaded fastener and which has an open side facing endwise of the block, and the clamp body has a boss in its cavity which is receivable endwise of the block in the head receiving cavity.

10. The structure according to claim 6 wherein the terminal blocks and the reversing block each is provided with a means for positioning it on said support, clamping members are provided at opposite ends of the row, respectively, for clamping engagement with said support for maintaining the blocks in longitudinally assembled relation on said support, and each clamping member and its associated block have an interfitting projection and cavity connection with each other.

References Cited by the Examiner

UNITED STATES PATENTS

| | | | |
|---|---|---|---|
| Re. 25,446 | 9/1963 | Ustin | 339—198 |
| 1,984,036 | 12/1934 | Schwartzmann | 339—198 X |
| 2,724,814 | 11/1955 | Stubbers | 339—198 |
| 2,743,373 | 4/1956 | De Smidt | 339—198 |
| 2,884,613 | 4/1959 | Chandler et al. | 339—198 |
| 2,922,139 | 1/1960 | Ustin | 339—198 |
| 2,981,922 | 4/1961 | Van Valkenburg et al. | 339—198 |
| 3,212,051 | 10/1965 | Clewes | 339—198 |

FOREIGN PATENTS

| | | |
|---|---|---|
| 12,873 | 10/1956 | Germany. |
| 347,867 | 9/1960 | Switzerland. |

OTHER REFERENCES

Electrical Design News, June 1958, page 21, Buchanan.

EDWARD C. ALLEN, *Primary Examiner.*

ALFRED S. TRASK, *Examiner.*